Jan. 20, 1931.  J. R. SCHOPP  1,789,600
MEANS FOR SPREADING GRIT IN THE PATHS OF AUTOMOBILE DRIVE WHEELS
Filed Sept. 18, 1930  3 Sheets-Sheet 3

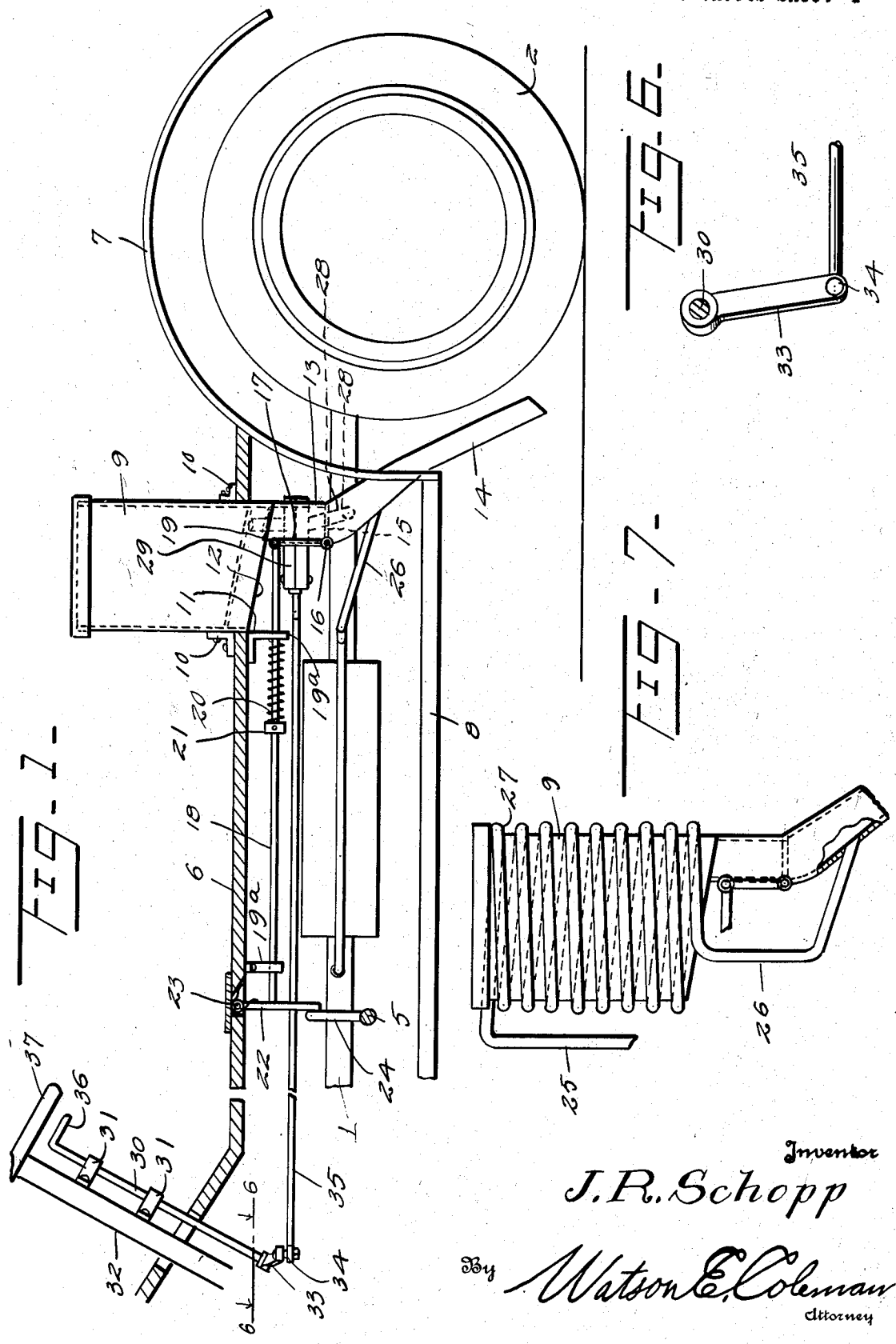

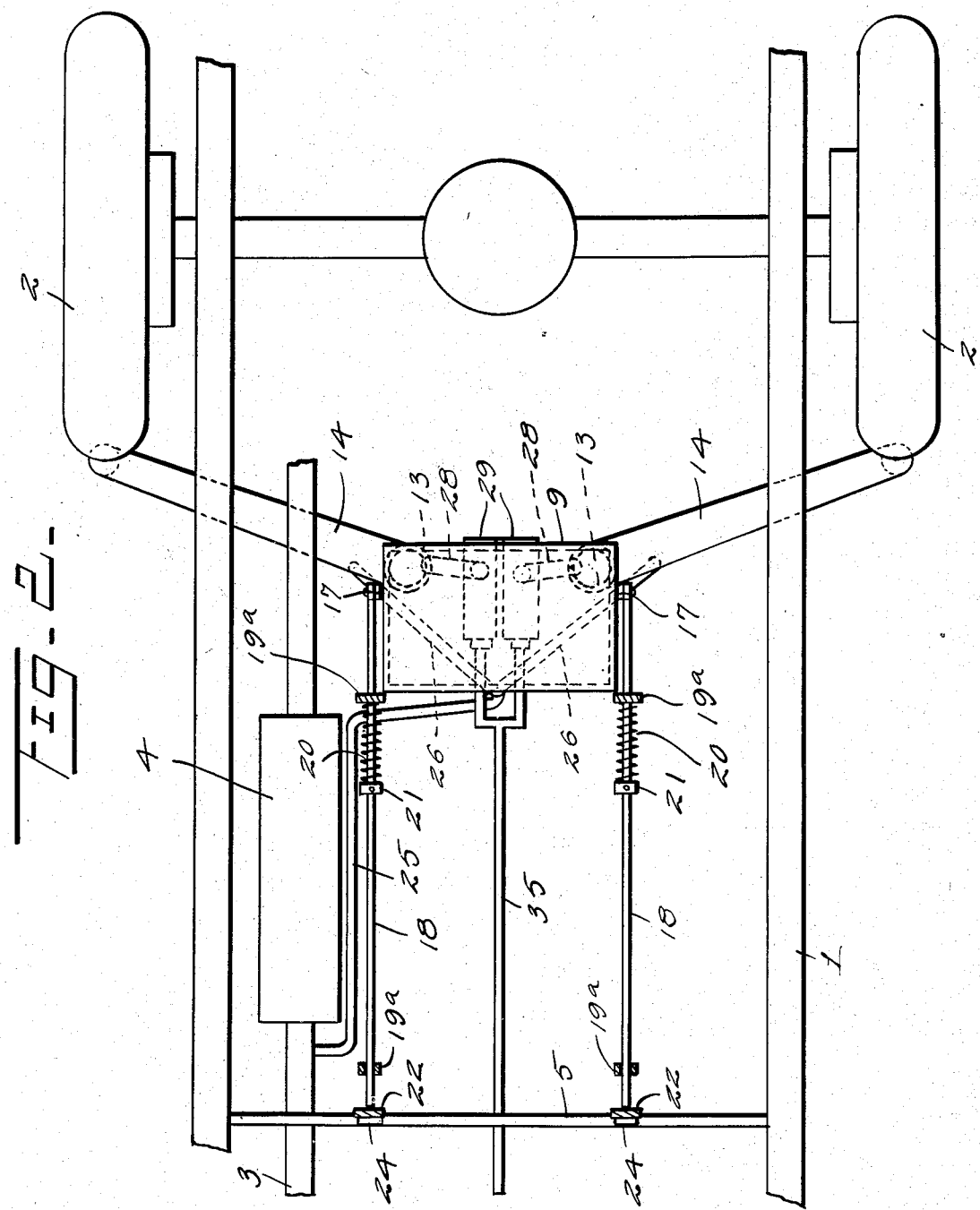

Inventor
J. R. Schopp
By Watson E. Coleman
Attorney

Patented Jan. 20, 1931

1,789,600

UNITED STATES PATENT OFFICE

JAMES R. SCHOPP, OF LANCASTER, OHIO

MEANS FOR SPREADING GRIT IN THE PATHS OF AUTOMOBILE DRIVE WHEELS

Application filed September 18, 1930. Serial No. 482,857.

This invention relates to automobiles, and more particularly to means adapted to spread grit in the paths of the rear or drive wheels of automobiles, to the end that such wheels may be prevented from skidding laterally and circumferentially on wet or snow or ice covered roads and streets.

The invention has for one of its objects to provide novel means of the character stated which shall be adapted to be operated automatically during the initial phase of the application of the brakes of the automobile, to the end that the grit will be spread in the paths of the rear wheels of the automobile prior to the application of the brakes.

The invention has for a further object to provide means of the character stated which shall be adapted to be operated manually, to the end that the driver of the automobile may spread grit in the paths of the rear wheels when necessary to permit the wheels to obtain a firm grip on the road or street.

The invention has for a further object to provide means of the character stated which shall be adapted to utilize the exhaust gases of the engine of the automobile to effect the spreading of the grit and to prevent its freezing prior to the spreading thereof.

The invention has for a still further object to provide means of the character stated which shall be simple, durable and capable of being manufactured and sold at a comparatively low cost, and which shall be adapted to be readily applied to trucks, busses or other automobiles.

Figure 1 is a view partly in side elevation and partly in vertical section illustrating the application of the grit spreading means to an automobile.

Figure 2 is a top plan view of the grit spreading means and the rear portion of the chassis of an automobile.

Figure 3 is a view in front elevation of the grit spreading means and a portion of the automobile chassis.

Figure 4 is a sectional view taken on the vertical plane indicated by the line 4—4 of Figure 3.

Figure 5 is a sectional view taken on the planes indicated by the line 5—5 of Figure 3.

Figure 6 is a sectional view taken on the horizontal plane indicated by the line 6—6 of Figure 1, and Figure 7 is a view in side elevation of a slightly modified form of the grit spreading means.

Referring in detail to the drawings, 1 designates the frame, 2 the rear or drive wheels, 3 the exhaust pipe, 4 the muffler and 5 one of the cross brake shafts of an automobile. 6 designates the floor, 7 the rear fenders, and 8 the running boards of the automobile.

The grit spreading means comprises a tank 9 which is adapted to contain the grit which may consist of sand, fine stone or the like. The tank 9 which is located at the longitudinal center of the automobile and forwardly of the rear wheels 2, is secured to the floor 6, as shown at 10. The lower end of the tank 9 extends through an opening 11 formed in the floor 6, and the bottom 12 of the tank slopes downwardly from the front to the rear wall of the tank and also slopes downwardly from the longitudinal center of the tank. The tank 9 is provided at the lower rear corners thereof with downwardly extending outlet nipples 13 into which the grit is directed by the sloping bottom wall 12 of the tank. Pipes 14 extend outwardly, rearwardly and downwardly from the lower ends of the nipples 13, and have their lower or discharge ends arranged in advance of the rear wheels 2 and close to the paths of the wheels.

Valve plates 15 are arranged within the upper ends of the pipe 14, and are pivotally connected at their front edges to the pipes so as to permit them to be swung into closed or opened position. When in closed position, the valve plates 15 extend across the lower ends of the nipples 13 and when in opened position, they extend downwardly and rearwardly into the upper ends of the pipes 14. The pivots 16 of the valve plates 15 extend outwardly beyond the pipes 14, and secured to said ends of the pivots are upwardly directed operating arms 17. Rods 18 which are pivotally connected, as at 19, to the upper ends of the arms 17, extend forwardly from the arms, and are slidably mounted in bearing brackets 19ª secured to and extending downwardly from the floor 6.

Coil springs 20 which surround the rods 18 between certain of the bearing brackets 19ª and collars 21 fixed to the rods, function to normally maintain the valve plates 15 in closed position.

Levers 22 extend downwardly from the floor 6 across the front ends of the rods 18, and are connected at their upper ends to the floor by spring hinges 23 which normally maintain them in a vertical position out of contact with the front ends of the rods. The front ends of the rods 18 and the lower ends of the levers 22 are located above and rearwardly of the shaft 5. The shaft 5 turns rearwardly during the application of the brakes of the automobile, and arms 24 extending upwardly from the shaft when the brakes are released, contact with the lower ends of the levers 22 during the initial phase of the application of the brakes. The arms 24, during this phase of the application of the brakes, swing the levers 22 upwardly and rearwardly, and thereafter pass by the lower ends of the levers. This movement of the levers 22 imparts a rearward thrust to the rods 18, with the result that the valve plates 15 are swung downwardly into opened position. The rods 18 are moved rearwardly against the tension of the springs 20 which, after the arms 24 move out of contact with the levers 22, react and move the rods 18 forwardly, with the result that the valve plates 15 are swung upwardly into closed position. During the period that the valve plates 15 are opened the grit flows into the pipes 14 and is directed by the pipes in the paths of the rear wheels 2. When the brakes are released, the shaft 5 turns forwardly and carries the arms 24 into their normal position forwardly of the lower ends of the lever 22.

A tube 25 which communicates with the exhaust pipe 3 at a point forwardly of the muffler 4 and which extends rearwardly from the exhaust pipe to a point below the tank 9, is provided at its rear end with branches or nozzles 26 which communicate with the pipes 14 at points below and forwardly of the opened position of the valve plates 15, to the end that the exhaust gases from the engine of the automobile may be directed to the pipes 14 so as to forcibly expel the grit from these pipes into the paths of the rear wheels 2. The nozzles 26 discharge downwardly and rearwardly into the pipes 14, and the valve plates 15 when in opened position extend downwardly and rearwardly across the discharge ends of the nozzles, with the result that the exhaust gases are caused to flow downwardly through the pipes and thus insure the positive discharge of the grit therefrom. As shown in Figure 7, the tank 9 may be provided with a coil 27 which surrounds the tank and is interposed between the tube 25 and the nozzles 26 so as to cause the exhaust gases to pass therethrough on their way to the nozzles, the passing of exhaust gases through the coil maintaining the temperature of the tank sufficiently high to prevent the freezing of the grit therein and thus insure its free passage to the pipe 14 when the valve plates 15 are opened.

Tubes 28 extend from the bottom of the tank 9 to the pipes 14 and communicate with the pipes at points below the valve plates 15. Valves 29 are arranged in the tubes 28 and are slidably mounted for movement into opened or closed position. When in closed position, the valves 29 extend across the tubes 28, and when in opened position, the valves are located outwardly beyond the tubes. The valves 29 move forwardly whle being opened and rearwardly while being closed. Means are provided to permit the valves 29 to be opened or closed manually, and this means comprises a shaft 30 journaled in bearings 31 secured to the steering column 32 of the automobile in a manner to support the shaft in parallel relation to the steering column. The shaft 30 is provided at its lower end with a crank 33 which is pivotally connected as at 34, to the front end of a rod 35 extending forwardly from the valves 29. The valves 29 are normally closed, and the shaft 30 is provided at its upper end with an arm 36 located near the steering wheel 37 of the automobile and through the medium of which the driver may turn the shaft to open the valves or return them to closed position. These valves and the operating means therefore render the device operable, independently of the brakes, to permit the spreading of the grit in the paths of the rear wheels 2 when necessary to overcome slippery road or street conditions.

From the foregoing description, taken in connection with the accompanying drawings, it will be understood that the device is adapted to automatically function during the initial phase of the application of the brakes to spread grit in the paths of the rear wheels, that it is adapted to be manually operated independently of the brakes to effect the spreading of the grit in the paths of the rear wheels, and that the spreading of the grit in such paths will prevent the skidding of the rear wheels after the application of the brakes and while the automobile is in motion. It will also be understood that the device is simple and capable of being manufactured and sold at a comparatively low cost, and that it may be readily applied to an automobile of any type.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

1. A grit spreading device for an automobile, comprising a tank adapted to hold the grit and mounted on the automobile, pipes extending downwardly from the tank and having their lower or discharge ends arranged in advance of the rear wheels of the automobile and close to the paths of the wheels, valves for controlling the passage of the grit from the tank to the pipes, rods slidably mounted on the automobile and connected at certain ends thereof to the valves, levers extending across the other ends of the rods, spring hinges connecting the levers to the automobile, a brake cross shaft provided with arms arranged for contact with the levers during the initial phase of the application of the brakes, and springs bearing against the rods to normally hold the valves in closed position.

2. A grit spreading device for an automobile, comprising a tank adapted to hold the grit and mounted on the automobile, pipes extending downwardly from the tank and having their lower or discharge ends arranged in advance of the rear wheels of the automobile and close to the paths of the wheels, valves for controlling the passage of the grit from the tank to the pipes, valve operating means, nozzles having their discharge ends arranged in the pipe below the valves, and a coil surrounding the tank and communicating at one end with the exhaust pipe of the automobile and the other end with the nozzles.

3. A grit spreading device for an automobile, comprising a tank adapted to hold the grit and mounted on the automobile, pipes extending downwardly from the bottom of the tank and having their lower or discharge ends arranged in advance of the rear wheels of the automobile and close to the paths of the wheels, valves for controlling the passage of the grit from the tank to the pipes, means yieldingly holding the valves in closed position, brake controlled means for opening the valves during the initial phase of the application of the brakes, tubes extending solely in a downward and outward direction from the bottom of the tank to the pipes and communicating with the latter at points below the valves, valves in the tubes and normally closed, and manually operable means for opening said second valves.

In testimony whereof I hereunto affix my signature.

JAMES R. SCHOPP.